US006631410B1

(12) United States Patent
Kowalski et al.

(10) Patent No.: US 6,631,410 B1
(45) Date of Patent: Oct. 7, 2003

(54) MULTIMEDIA WIRED/WIRELESS CONTENT SYNCHRONIZATION SYSTEM AND METHOD

(75) Inventors: John Michael Kowalski, Vancouver, WA (US); Atsushi Ishii, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/527,478

(22) Filed: Mar. 16, 2000

(51) Int. Cl.⁷ .............................................. H04N 7/15
(52) U.S. Cl. ...................... 709/224; 709/206; 709/228; 370/318
(58) Field of Search ................................. 709/203, 204, 709/206, 216, 217, 224, 227; 370/318, 253; 379/32.4; 348/537

(56) References Cited

U.S. PATENT DOCUMENTS

| | | | | |
|---|---|---|---|---|
| 5,113,354 A | * | 5/1992 | Harper et al. ................ 364/514 |
| 5,617,539 A | | 4/1997 | Ludwig et al. ............... 709/205 |
| 5,623,483 A | | 4/1997 | Agrawal et al. .............. 370/253 |
| 5,689,641 A | | 11/1997 | Ludwig et al. ............... 709/241 |
| 5,717,689 A | * | 2/1998 | Ayanoglu .................... 370/349 |
| 5,754,241 A | | 5/1998 | Okada et al. .............. 375/240.05 |
| 5,754,961 A | | 5/1998 | Serizawa et al. ............. 455/517 |
| 5,757,857 A | | 5/1998 | Buchwald .................... 375/271 |
| 5,758,079 A | | 5/1998 | Ludwig et al. ............... 709/204 |
| 5,768,321 A | | 6/1998 | Watanabe et al. ............. 375/344 |
| 5,777,612 A | | 7/1998 | Kataoke .................... 715/500.1 |
| 5,778,191 A | | 7/1998 | Levine et al. ................ 709/247 |
| 5,790,533 A | | 8/1998 | Burke et al. ................. 370/318 |
| 5,790,792 A | | 8/1998 | Dudgeon et al. ............. 709/203 |
| 5,802,294 A | | 9/1998 | Ludwig et al. ............... 709/204 |
| 5,809,075 A | | 9/1998 | Townshend ................... 375/254 |
| 5,809,454 A | | 9/1998 | Okada et al. ................. 704/214 |
| 5,815,634 A | | 9/1998 | Daum et al. .................. 386/96 |
| 5,818,906 A | | 10/1998 | Grau et al. ................. 379/32.4 |
| 5,828,866 A | | 10/1998 | Hao et al. ...................... 703/7 |
| 5,832,088 A | | 11/1998 | Nakajima et al. .............. 380/22 |
| 5,832,218 A | | 11/1998 | Gibbs et al. ................. 709/203 |
| 5,841,482 A | | 11/1998 | Wang et al. ................. 348/537 |
| 5,844,600 A | * | 12/1998 | Kerr ............................ 348/17 |
| 5,854,799 A | | 12/1998 | Okada et al. ................ 714/781 |
| 5,854,893 A | | 12/1998 | Ludwig et al. ............... 709/204 |
| 5,857,201 A | | 1/1999 | Wright, Jr. et al. ......... 707/104.1 |
| 5,862,451 A | | 1/1999 | Grau et al. .................. 725/110 |
| 5,867,654 A | | 2/1999 | Ludwig et al. ............... 725/116 |
| 5,884,039 A | | 3/1999 | Ludwig et al. ............... 709/227 |
| 5,886,734 A | | 3/1999 | Ozone et al. ............... 348/14.09 |
| 6,065,092 A | * | 5/2000 | Roy .............................. 711/5 |
| 6,151,375 A | * | 11/2000 | Nakatsugawa ............... 375/370 |
| 6,374,336 B1 | * | 4/2002 | Peters et al. ................ 711/167 |

* cited by examiner

Primary Examiner—Hosain T. Alam
Assistant Examiner—Khanh Quang Dinh
(74) Attorney, Agent, or Firm—Robert D. Varitz, P.C.

(57) ABSTRACT

A system for synchronizing a multimedia content stream signal, emanating from at least one multimedia source, for play through a plurality of output devices, wherein the output devices are connected to the multimedia source by wired connections and wireless connections; the system including plural output realms, including wired realms and wireless realms; and which includes delay synchronizers and for determining a buffer delay for streaming the multimedia content stream signal from a buffer to an output device. A method of synchronizing a multimedia content stream for output to a plurality of wired and wireless output device in a network having plural realms, wherein each realm includes a CTL, includes buffering the multimedia content stream in a first realm; determining a buffer delay; transmitting the buffer delay to all CTLs in all realms of the network; and transmitting the multimedia content stream to all realms in the network.

3 Claims, 2 Drawing Sheets

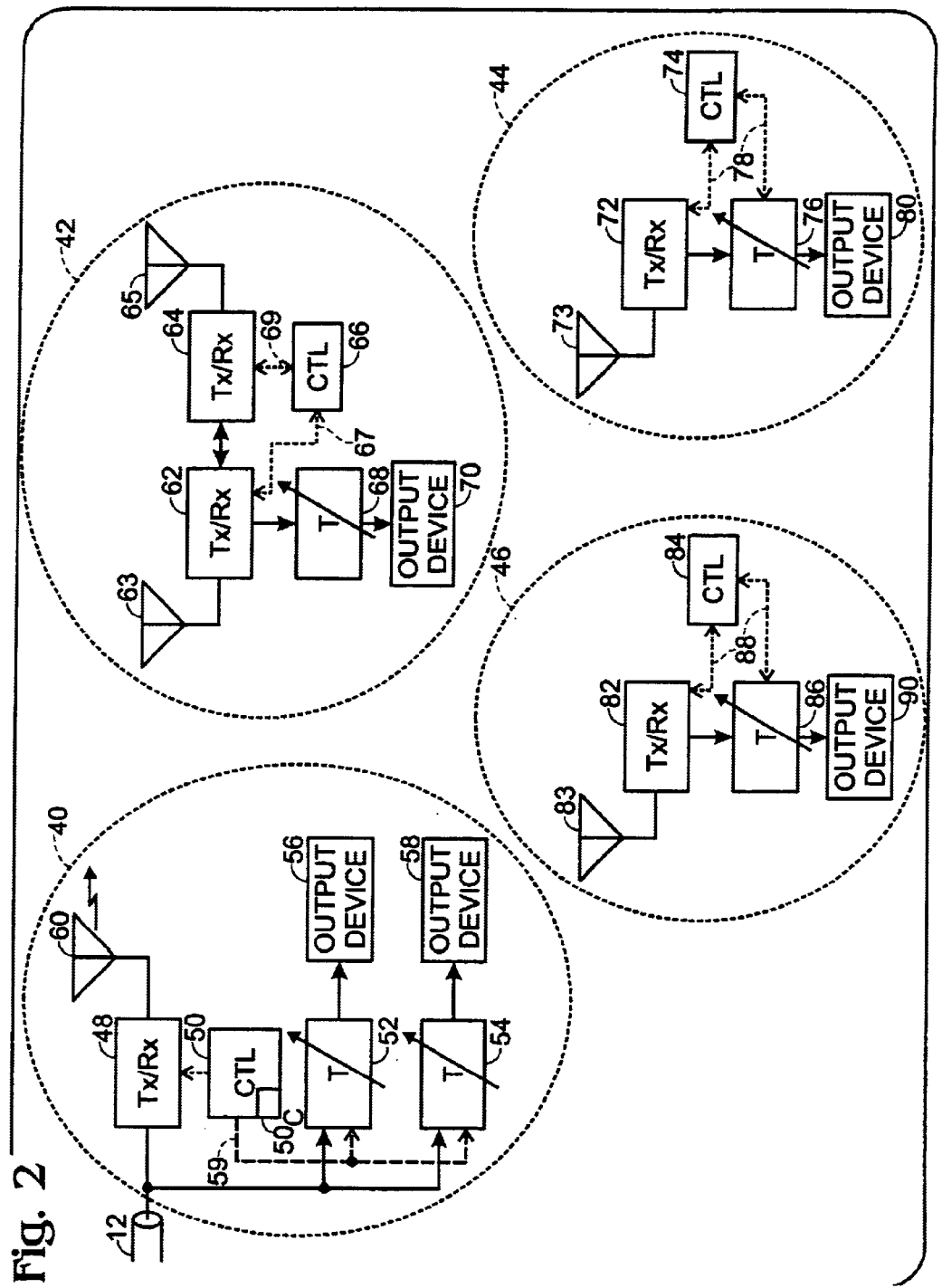

MULTIMEDIA WIRED/WIRELESS CONTENT SYNCHRONIZATION SYSTEM AND METHOD

FIELD OF THE INVENTION

This invention relates to communications networks, and specifically to a network which is suitable for home use, for the synchronization of distributed wired/wireless multimedia content to be played by multiple multimedia devices, e.g. monitors, audio systems, etc., and to a method for synchronizing wired and wireless output devices.

BACKGROUND OF THE INVENTION

The prior art in this field is generally concerned with minimization of network latency. Most of the prior art relates to transmission of multimedia through wired networks, and does not consider that in wireless broadcast applications, imposition of delay through channel coding, or retransmit delay, is both feasible and necessary.

In known multi-stream multimedia play back systems, where the streams are output on different types of devices, playing the same set of streams on different output devices requires the use of a single transmission media. The use of different transmission media, which may include multiple hops over wireless media, as well as multiple hops over wired media, is not considered. The use of different transmission media may be of particular relevance to home and small office networks, where repeaters may be used to account for uncertain propagation conditions within the home/small office. The prior art does not consider networks in which a multimedia stream, because of quality-of-signal (QoS), or capacity limitations, may have different transmission rates at different points in the network. Furthermore, the use of wired/wireless media implies that different delays imposed by coding may be needed. The prior art does not consider networks in which multiple streams can arise from different physical locations in the network with different delays, which might occur within certain ad-hoc networks; and the prior art does not consider that a priori network information may be exploited so that new devices may "join" the network mid-transmission.

U.S. Pat. No. 5,617,539, for "Multimedia collaboration system with separate data network and A/V network controlled by information transmitting on the data network," to Ludwig et al., granted Apr. 1, 1997, describes a system that integrates real-time and asynchronous networks. This system, however, does not address the wired/wireless synchronization issue, nor does it address the multi-hop wireless synchronization issue.

U.S. Pat. No. 5,623,483, for "Synchronization System for Networked Multimedia Streams," to Agrawal et al., granted Apr. 22, 1997, discusses multi-stream multimedia content which is played on different output devices and how, with the use of buffers, two disparate multimedia streams may be synchronized to each other.

U.S. Pat. No. 5,689,641, for "Multimedia collaboration system arrangement for routing compressed AV signal through a participant site without decompressing the AV signal," to Ludwig et al., granted Nov. 18, 1997, further describes the system of U.S. Pat. No. 5,617,539.

U.S. Pat. No. 5,790,792, for "Method and apparatus for transmitting multimedia from an application logic server to interactive multimedia workstations," to Dudgeon et al., granted Aug. 4, 1998, describes a network wherein a server handles all processing of real-time graphical images, however, this reference does not consider synchronization or wireless issues.

U.S. Pat. No. 5,754,241, for "Video decoder capable of controlling encoded video dat," to Okada et al., granted May 19, 1998, describes an MPEG decoder having an over-flow proof buffer.

U.S. Pat. No. 5,754,961, for "Radio communication system including SDL having transmission rate of relatively high speed," to Serizawa et al., granted May 19, 1998, describes a system having both high and low speed transmission/reception capabilities.

U.S. Pat. No. 5,757,857, for "High speed self-adjusting clock recovery circuit with frequency detection," to Buchwald, granted May 26, 1998, describes a circuit wherein all transmission is done without any systemic phase offset.

U.S. Pat. No. 5,758,079, for "Call control in video conferencing allowing acceptance and identification of participants in a new incoming call during an active teleconference," to Ludwig et al., granted May 26, 1998, is related to U.S. Pat. No. 5,689,641, discussed above. This reference continues the discussion of synchronization of real-time and asynchronous networks, but still fails to address the issue of wired/wireless packet data synchronization.

U.S. Pat. No. 5,768,321, for "Automatic frequency control unit which detects a frame pattern in a phase modulation signal," to Watanabe et al., granted June 16, 1998, describes the transmission of a multimedia signal by a satellite communications system.

U.S. Pat. No. 5,777,612, for "Multimedia dynamic synchronization system," to Kataoke, granted Jul. 7, 1998, describes a multimedia system which allows a user to output synchronized multimedia information starting at a point other than the beginning of a data stream.

U.S. Pat. No. 5,778,191, for "Method and device for error control of a macroblock-based video compression technique," to Levine et al., granted Jul. 7, 1998, describes application of a fixed length packet synchronization system to variable length data.

U.S. Pat. No. 5,790,533, for "Method and apparatus for adaptive RF power control of cable access units," to Burke et al., granted Aug. 4, 1998, describes the use of adaptive RF control of data transmission from a device, such as an A/V receiver, attached to a communications network.

U.S. Pat. No. 5,802,294, for "Teleconferencing system in which location video mosaic generator sends combined local participants images to second location video mosaic generator for displaying combined images," to Ludwig et al., granted Sep. 1, 1998, is a continuation of U.S. Pat. No. 5,689,641, discussed above.

U.S. Pat. No. 5,809,075, for "High speed communications system for analog subscriber connections," to Townshend, granted Sep. 15, 1998, describes a system using pulse code modulation to achieve relatively high transmission rates over conventional telephone lines.

U.S. Pat. No. 5,809,454, for "Audio reproducing apparatus having voice speed converting function," to Okada et al., granted Sep. 15, 1998, describes a system for increasing the transmission rate of voice data, while maintaining the normal pitch of the speaker's voice.

U.S. Pat. No. 5,815,634, for "Stream synchronization method and apparatus for MPEG playback system," to Daum et al., granted Sep. 29, 1998, describes a system for pausing or freeze-framing an audio visual presentation wherein the sound is muted when the picture is stopped, and wherein the sound and picture are substantially synchronized when playback resumes. This reference does not address the technology as applied to a wireless/wired interface.

U.S. Pat. No. 5,818,906, for "Connection event reporting in a cable telephony system," to Grau et al., granted Oct. 6, 1998, describes a system wherein events which occur on the communication system are logged, and information about the type and frequency of connections made available for network management.

U.S. Pat. No. 5,828,866, for "Real-time synchronization of concurrent views among a plurality of existing applications," to Hao, et al., granted Oct. 27, 1998, describes a system for synchronizing multiple applications located and operating on multiple processors.

U.S. Pat. No. 5,832,088, for "Method and apparatus for preventing data copying from a disk using data lengths too large for a pirate medium," to Nakajima et al., granted Nov. 3, 1998 describes a system for preventing the recording of data by an unauthorized entity.

U.S. Pat. No. 5,832,218, for "Client/server electronic mail system for providing off-line client utilization and seamless server resynchronization," to Gibbs et al., granted Nov. 3, 1998, describes a system for synchronizing an EMail server to a client.

U.S. Pat. No. 5,841,482, for "Transition aligned video synchronization system," to Wang et al., granted Nov. 24, 1998, describes the insertion of delay signals into an A/V 20 signal without the use of a phase locked loop.

U.S. Pat. No. 5,854,799, for "Video decoder with functions to detect and process errors in encoded video data," to Okada et al., granted Dec. 29, 1998, describes the replacement of an error-carrying macroblock with an error-free macroblock from a previous frame.

U.S. Pat. No. 5,854,893, for "System for teleconferencing in which collaboration types and participants by names or icons are selected by a participant of the teleconference," to Ludwig et al., granted Dec. 29, 1998, is a continuation of U.S. Pat. No. 5,689,641, discussed above, and relates to a teleconferencing system wherein the current participants control entry of new participants into the conference.

U.S. Pat. No. 5,857,201, for "Enterprise connectivity to handheld devices," to Wright, Jr. et al., granted Jan. 5, 1999, describes a system wherein a variety of devices may be connected to a central server regardless of the devices' operating system.

U.S. Pat. No. 5,862,451, for "Channel quality management in a cable telephony system," to Grau et al., granted Jan. 19, 1999, describes a system wherein, upon initiation of a link by a user, and upon location of a busy channel that the link is intended to traverse, an idle channel is queried to determine if the idle channel is of sufficient quality to complete the link.

U.S. Pat. No. 5,867,654, for "Two monitor videoconferencing hardware," to Ludwig et al., granted Feb. 2, 1999, is related to U.S. Pat. No. 5,689,641, and describes the use of two monitors in a videoconferencing system.

U.S. Pat. No. 5,884,039, for "System for providing a directory of AV devices and capabilities and call processing such that each participant participates to the extent of capabilities available," to Ludwig et al., granted Mar. 16, 1999, is related to U.S. Pat. No. 5,689,641, and describes limiting the implementation to a least common denominator.

U.S. Pat. No. 5,886,734, for "Apparatus and method for storage and playback of video images and audio messages in multipoint videoconferencing," to Ozone et al., granted Mar. 23, 1999, describes a video conferencing "hold" button. The reference does not address the issue of wireless/wired networks.

SUMMARY OF THE INVENTION

A system for synchronizing a multimedia content stream signal, emanating from at least one multimedia source, for play through a plurality of output devices, wherein the output devices are connected to the multimedia source by wired connections and wireless connections; the system including plural output realms, including wired realms and wireless realms; and which includes delay synchronizers and for determining a buffer delay for streaming the multimedia content stream signal from a buffer to an output device. A method of synchronizing a multimedia content stream for output to a plurality of wired and wireless output device in a network having plural realms, wherein each realm includes a CTL, includes buffering the multimedia content stream in a first realm; determining a buffer delay; transmitting the buffer delay to all CTLs in all realms of the network; and transmitting the multimedia content stream to all realms in the network.

An object of the invention is to provide a system and method for integrating a wired and wireless multimedia network.

Another object of the invention is to provide for the synchronization of a multistream, multimedia network.

A further object of the invention is to provide a system and method for determining a buffer, or synchronization, delay to synchronize a multimedia content stream output from a plurality of wired and wireless output devices.

These and other objects and advantage of the invention will become more fully apparent as the description is read in conjunction with the drawings.

BRIEF DESCRIPTION OF THE DRAWINGS

FIG. 2 is a block diagram of the system of FIG. 1 in a wired/wireless network.

DETAILED DESCRIPTION OF THE PREFERRED EMBODIMENT

As previously noted, the prior art in this field is generally concerned with minimization of network latency. In this invention, minimization of network latency is sacrificed for synchronization and channel reliability. For high-speed high quality wireless video, in channels of questionable reliability, one can trade off coding delay, or retransmit delay in the case of packet data formatting, for an improved bit error rate.

In a "wall hanging TV monitor" for example, it is desired to synchronize audio and video between multiple wired monitors/speakers and wireless monitors/speakers. This invention provides a system and method for accomplishing this goal, based on knowledge of the physical layer formatting of the multimedia content, media access control (MAC) layer messages, and the time delay that formatting entails. Furthermore, this system works regardless of the media content, so long as the transmitter and remote monitors are "aware" of the multimedia physical layer formatting scheme, and QoS assumptions i.e., for packet data transmission, the packet lengths, and probabilities of dropped packets.

The invention specifically relates to the use of high-speed, high reliability broadcast applications e.g., HDTV, over mixed wired/wireless small office/home networks. For such applications, the unlicensed national information infrastructure (5 GHz) band is likely to be used; this band, while providing 100 MHz of bandwidth for applications, may have severe propagation limitations relative to lower frequencies, e.g., 900 MHz. Delay elements are needed at various points in the network to deliver such contents in these networks, with arbitrary robustness. This invention provides the required degree of robustness.

Adaptive Buffer Determination

Figure 1:
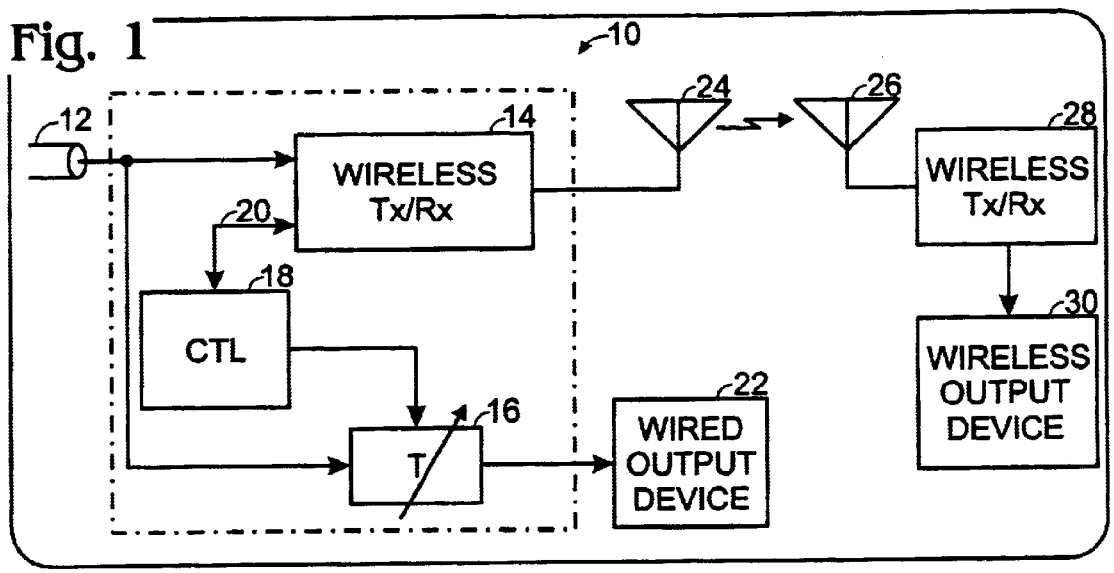
FIG. 1 is a block diagram of a content synchronization system.

FIG. 1 illustrates a content synchronization system generally at 10. A single multimedia source "pipe" 12 may be used to play through a plurality of output devices, at least one of which is wireless. The wireless transmission, as in the wired case, is assumed to be implemented using a transmission protocol based an extension of on the open systems interconnect (OSI) model, such as described by Mischa Schwartz, *Telecommunication Networks: Protocols, Modeling and Analysis*, Addison-Wesley, 1987, which protocol includes a conventional MAC layer. An example of such a wireless transmission system is IEEE Standard 802.11 (1997). System 10 includes a wireless transceiver 14 which receives a signal from source 12. Source 12 also sends a signal to a delay synchronizer 16. A connection control processor (CTL) 18 exchanges MAC layer messages 20 with wireless transceiver 14 and delay synchronizer 16. Delay synchronizer 16 is connected to a wired output device 22. Wireless transceiver 14 is attached to an antenna 24, which transmits a signal to an antenna 26, connected to a remote wireless transceiver 28 and a wireless output device 30. "Wireless," as used herein, includes RF and optical links, such as IR.

The MAC layer is responsible for negotiating access to the medium, is the layer of the transmission protocol responsible for allocating capacity over the channel, and, can negotiate data rates, data formats, QoS, security, etc, when the protocol allows. Within MAC layer messaging, there is sufficient information to synchronize multiple output streams. In systems where different OSI models are used, software entities known as interworking units (IWUs) are used to convert differently formatted information, such as the above, between the relevant layers of the models. Therefore, the examples presented herein illustrate a preferred embodiment of the invention of a multimedia network which includes multiple transmission protocols.

Multimedia content is simultaneously played on wired output device 22, which is hard-wired to source 12, through delay synchronizer 16 and wireless device 30. In the case of continuously streamed data, the problem of propagation and coding delays must be resolved. In the case of packet services, retransmission delays must be resolved. In the following example, a packet transmission system having packets of a fixed length of N octets (bytes) is assumed. The adaptation of the fixed packet length to one of variable length packet streams is within the abilities of one of ordinary skill in the art, as shown in U.S. Pat. No. 5,778,191.

A packet is successfully received over the wireless portion of system 10 with probability p and with an error probability of (1−p), where p depends upon channel conditions and signal level. Often, such networks employing an OSI model for transmission employ automatic repeat request (ARQ) in the event that a packet is unsuccessfully received. ARQ includes a "timer" that allows n transmission attempts before a packet is dropped. Thus the probability of successfully receiving a packet, Ps, in this case, incurring up to n packets of delay, is, assuming independent retransmission attempts:

$$Ps=1-(1-p)^n \tag{1}$$

Thus, for a given Ps based upon desired QoS, the buffer length may be determined from the packet length, Eq. 1, and incidental coding/decoding/formatting delays, which, because of the MAC layer procedures, are known at both the transmission and reception ends. As an example, in IEEE Standard 802.11a, Wireless LAN, forward error correction (FEC) is achieved with a convolution code which is rate dependent. the coding delay is a fixed set of hardware-dependent symbols.

Clearly, the above scheme is sufficient to provide for Ps arbitrarily close to unity, provided that any delay may be tolerated.

Hence, a synchronization delay size $T_D$ for FIG. 1 of:

$$T_D=nN \tag{2}$$

bytes is sufficient to insure delay synchronization between the wired and wireless output devices. Synchronization delay is provided by delay synchronizer 16, which functions as, and may be thought of, as a delay buffer. If the packet is transmitted at a rate of $R_p$ packets per second, including the formatting and coding delays, then the buffer will require matching an end-to-end delay (TED) of:

$$TED=n/R_p \tag{3}$$

seconds. Alternatively, as in U.S. Pat. No. 5,623,483, a buffer size may, under certain conditions, require a TED, in seconds, that results in a fixed packet loss rate. U.S. Pat. No. 5,623,483, describes that such a TED threshold may be computed based on a packet delay distribution. However, this is only true, provided either such a distribution is known or can be learned. This will not be the case if the packet loss process or signal to noise ratio of the network is not at least locally ergodic, i.e., measurable from the samples in real time. However if the network's packet loss process or signal-to-noise ratio is at least locally ergodic, then techniques such as those described in J. Kowalski, *A Contribution to Robust Detection and Estimation in Dependent Noise*, Polytechnic University, Brooklyn, N.Y., Doctoral Thesis, 1993, may be used to estimate the packet delay distribution. U.S. Pat. No. 5,623,483 does not, however, teach or suggest how this distribution may be estimated.

Once the TED is determined, the synchronization delay size can be chosen as:

$$T_D=N*TED*R_p \tag{4}$$

bytes, which takes into consideration that the packets arrive randomly in time. Either method may be used in implementing the invention.

The system of FIG. 1 may be extended to include multiple streams, as depicted in FIG. 2, which depicts an example of a wired/wireless multimedia network having a plurality of output devices. Multimedia source 12 sends multimedia information, which may consist of multiple streams, to plural output devices, wherein the output devices are located in plural realms. As depicted in FIG. 2, multimedia source 12 sends multimedia information to a wired, or first, realm 40, which functions as a gateway to the wired/wireless network, which, in turn, transmits a wireless signal to wireless, or other, realms 42, 44 and 46. As will be appreciated by those of skill in the art, there is no restriction on the number of wired and wireless realms that may be part of a network constructed according to the invention. The repeaters may perform additional coding and decoding, and are operable to synchronize several streams of multimedia information, e.g., audio, video, and text data.

Realm 40 includes a first wired realm transceiver 48, a first CTL 50 to provide the requisite delay and synchronization, two wired realm delay synchronizers 52, 54, and output devices 56, 58, which may be connected in both a wired and wireless network, connected to wired realm delay synchronizers 52, 54 respectively. MAC layers messages 59 are exchanged between CTL 50 and the wired realm delay synchronizers. An antenna 60 transmits a wireless signal to the other realms.

Realm 42 is constructed to provide a wireless re-transmission of multimedia information to yet other realms, and includes a pair of second wireless repeaters 62, 64, for relaying a wireless signal. Transceivers 62, 64 function as a repeater to transmit the multimedia signal to places, such as realm 44, which are not reachable by the signal transmitted from realm 40. Antennas 63, 65 are connected to wireless realm transceivers 62, 64, respectively. A wireless realm CTL 66 exchanges MAC level messages 67, 69 with wireless realm transceivers 62 and 64, respectively. A wireless realm delay synchronizer 68 is connected to an output device 70. It should be appreciated that an output device may be connected to either a wired or wireless repeater: the device is not dependent on the nature of the signal coming into a realm.

Wireless realms 44 and 46 are terminal wireless realms, i.e., they do not retransmit multimedia information to other realms. To this end, each terminal wireless realm, respectively, includes a terminal wireless realm transceiver 72, 82, receiver, an antenna 73, 83, a CTL 74, 84, a wireless realm delay synchronizer 76, 86, MAC layer exchanges 78, 88 between the terminal wireless realm transceiver and the terminal wireless realm delay synchronizer through the CTL, and an output device 80, 90.

Figure 3:
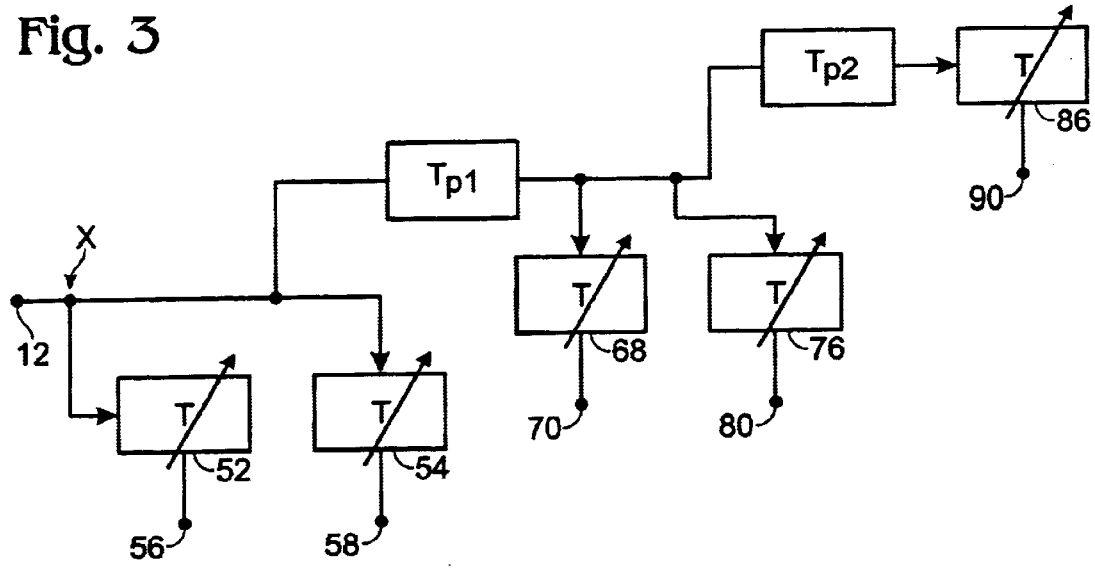
FIG. 3 is a block diagram of the network of FIG. 2 having an additional input node.

FIG. 3 is a depiction of the network of FIG. 2 as a quasi-graph to better illustrate the manner in which the problem of multi-stream, multimedia information is resolved. In every applied realization of the network there is a node X, which is the reference point for delay computations. X could, for analysis purposes, be subsumed into source 12, however, it is represented as a separate node for clarity. All delays are computed with respect to X. A connection control processor resides at point X, and at all nodes, or realms, as shown in FIG. 2. $T_{p1}$ and $T_{p2}$ represent delays imposed as a result of transmission over a wireless link, including retransmit, propagation, coding and signal formatting delays.

The propagation delays are assumed to be negligible, which is usually the case in home networks. Propagation delays over a home network, with a range of 300 feet, are at most 300 ns, which is generally small when compared to other delays.

The synchronization delays for every delay synchronizer are calculated as follows:

$$B_{D_{\max}}^{(52)} = \max_{\substack{\text{all} \\ \text{nodes}}} \left( \frac{TED}{R_P} \right) \quad (5)$$

where the notation $B_{D_{max}}^{(N)}$ is the delay to node $N_g$ of FIG. 3.

$$= B_{D_{\max}}^{(54)} \equiv B_{D_{\max}}(X) \quad (6)$$

$$B_{D_{\max}}^{(68)} = B_{D_{\max}}(X) - T_{pl} \quad (7)$$

And, in general $$B_{D_{\max}}(k) = B_{D_{\max}}(X) - \sum_{\forall_1}^{k} T_{p,i} \quad (8)$$

$\forall_i$ from X to k.

Such a formulation includes, in $B_{D_{max}}(X)$, delays calculated from assuming, or measuring, a fixed packet loss rate and retransmission. This delay is transmitted to CTLs 66, 74, 84, via MAC layer messages through the wired/wireless network, from CTL 50, where the delay is computed. In addition $B_{D_{max}}(k)$ is either computed at CTL 50 and transmitted to each realm or, equivalently, each realm computes $B_{D_{max}}(k)$ and transmits this information to all other relevant realms in the network, via MAC layer messages.

In ad-hoc network applications, the reference point X is established in an ad-hoc manner, i.e., when a communication link is established between a source, which can be at any realm in the network, and any receiving realm.

In addition, the above formulation may be changed to account for realms added to the network in mid-transmission as follows. If a transceiver in a newly added realm requests transmission, then during the transmission either:

1. apriori knowledge of previous network configurations and traffic can be used to get an estimate for $B_{D_{max}}(X)$; or
2. the output delay can be updated when an update for $B_{D_{max}}(X)$ is computed.

If a higher number for $B_{D_{max}}(X)$ is required for updating in mid-transmission, then a means must exist for delay updating and synchronization. In such a case output from the source may either be slowed down or suspended, i.e., the output buffer held constant while the delay buffer is updated, for a period of time while delays throughout the system are adjusted according to a revision of Eq. 8.

To summarize the procedure:

Step 1. On establishment of network connections, which may include both wired and wireless connections over a plurality of links, all the output devices connection control processors send messages to the source CTL ("node X"), which includes information on packet length, minimum packet rate, and total end-to-end delay computed from a given packet loss rate, and knowledge of the number of radio hops. The number of radio hops is known and transmitted by MAC layer messaging between wireless transceivers. In addition, apriori network information is employed if needed to establish the delay $B_{D_{max}}(X)$.

Step 2. The source CTL computes $B_{D_{max}}(X)$. as per Eq. 5 or, equivalently, Eq. 6, and transmits this value to the CTL in each realm, via MAC layer messages.

Step 3. For each realm in the network, (1) CTL 50 computes $B_{D_{max}}(k)$, and transmits this delay to the relevant realm in the network, or (2) $B_{D_{max}}(k)$ is computed locally in each realm in the network, as a function of $B_{D_{max}}(X)$. In either event, CTL 50 has knowledge of all realm delays. When the buffer delay establishment is complete, which is determined either via timers or MAC layer messaging, transmission begins.

Step 4. If a new output device joins the system in mid-transmission, and if its delay is not already accounted for either from the computation of $B_{D_{max}}(X)$ or from a-priori information, output to all realms is either suspended or slowed until all network delays are adjusted to account for the addition of the new output device. This applies when a new output device, located in a realm not previously in use in the network, joins the system, and also applies if a new output device in a realm that is already connected to the network joins the system.

Synchronization

The technique for how buffers may be determined for the multimedia synchronization system is described previously herein. The actual synchronization system is as follows:

FIGS. 1–3 illustrate an exemplary topography of a wired/wireless network. If a latched buffer is present at the output source of the multimedia stream, which stream is periodically clocked, the remaining wired/wireless network will operate in synchronization. CTL 50 of FIG. 2 is provided with such a clock 50C. Clock 50C operates at a rate which is related either as an integer multiple or divisor of the signaling rate of the channel. Data is clocked out of the buffer at that rate. In addition, for multiple radio hops, synchronization between repeaters is possible provided that data can be clocked at an integer multiple or divisor of all wireless signaling rates. In that case, synchronization of the wireless network after that point is possible, via phase locked loops and tracking loops, as described in M. K. Simon, J. K. Omura, et al., *Spread Spectrum Communications Handbook*, Revised Edition, McGraw-Hill 1994.

In this case, transmission of packets, which may still be random, but with discrete time, is synchronized to within a signaling interval, which allows for synchronized playback of the packets because the packets are either indexed or time-stamped. Assuming that indexing occurs with no loss in generality, a "start time" is sent to timers resident in CTL 66, 74, 84, from CTL 50 via link or network layer messages, as described in Schwartz, supra, and is sent through the wired/wireless network.

Individual timers in the CTLs 50, 66, 74, 84 are initialized via these messages, to synchronize the output to the output device of the first received packet, which is assumed to be indexed, as are all subsequent packets.

The use computation of the buffers is determined so that, within a predetermined packet loss rate, which loss rate is maintained to be low enough to enable packetized transmission of HDTV-like video; output is played back sequentially to within a certain degree of reliability based on Eq. 1. Because the packets are indexed, they can be played out in a sequence; if, in spite of the efforts described above, one packet is "missing," then transmission to the output device is suspended until a packet having a proper location in the sequence is received. With this means, as well as the tracking loops resident in the wireless devices, synchronization is maintained.

Thus, a system and method for synchronizing a multi-stream, multimedia network over wired and wireless links has been described. Although a preferred embodiment of the invention has been disclosed herein, it will be appreciated that further variations and modification may be made thereto within the scope of the invention as defined in the appended claims.

We claim:

1. A system for synchronizing a multimedia content stream signal, emanating from at least one multimedia source, for play through a plurality of output devices, wherein the output devices are connected to the multimedia source by wired connections and wireless connections; the system comprising:

plural output realms, including wired realms and wireless realms;

wherein said wired realms each include:
a wired realm transceiver;
a wired realm delay synchronizer, including a wired realm buffer for storing said multimedia content stream signal;
an output device connected to said wired realm delay synchronizer; and
a wired realm connection control processor (CTL) connected between said first wired realm transceiver and said wired realm delay synchronizer for exchanging medium access control (MAC) layer messages between said first wired realm transceiver and said wired realm delay synchronizer, and for determining a wired realm buffer delay for streaming the multimedia content stream signal from said wired realm buffer to an output device; and wherein said wireless realms each includes:
a wireless realm transceiver;
a wireless realm delay synchronizer; including a wireless realm buffer for storing said multimedia content stream signal;
an output device connected to said wireless realm delay synchronizer and
a wireless realm connection control processor (CTL) connected between said wireless realm transceiver and said wireless realm delay synchronizer for exchanging medium access control (MAC) layer messages between said wireless realm transceiver and said wireless realm delay synchronizer, and for determining a wireless realm buffer delay for streaming the multimedia content stream signal from said wireless realm buffer to an output device; and wherein said wireless realm buffer delay is transmitted to said wired realm CTL and wherein said wired realm buffer delay is transmitted to said wireless realm CTL.

2. The system of claim 1 wherein said wireless realm includes a second wireless transceiver for relaying the multimedia content stream signal to other wireless realms.

3. The system of claim 1 wherein said wired realm CTL includes a clock which operates at a known rate and wherein data is transmitted from said wired realm buffer at a rate taken from the group of rates consisting of the known rate, an integer multiple of the known rate and an integer divisor of the known rate.

* * * * *